United States Patent [19]

Burger

[11] 3,947,633

[45] Mar. 30, 1976

[54] CIRCUIT ARRANGEMENT FOR DEMODULATING A FREQUENCY-DIFFERENTIAL, PHASE-MODULATED SIGNAL

[75] Inventor: Erich Burger, Unterpfaffenhofen, Germany

[73] Assignee: Siemens Aktiengesellschaft, Berlin & Munich, Germany

[22] Filed: Nov. 7, 1974

[21] Appl. No.: 521,913

[30] Foreign Application Priority Data

Nov. 19, 1973 Germany............................ 2357655

[52] U.S. Cl. ...................... 178/67; 178/88; 325/30; 325/320
[51] Int. Cl.² .......................................... H04L 27/24
[58] Field of Search ............ 178/67, 88; 179/15 BC, 179/15 BY; 325/30, 320

[56] References Cited
UNITED STATES PATENTS 3,440,346    4/1969    Norby................................... 178/67

Primary Examiner—Albert J. Mayer

[57] ABSTRACT

In a data transmission system which uses frequency-differential phase modulation including a composite signal comprising a plurality of carriers apparatus is described for receiving and demodulating the aforementioned signal. In the receiver the signal, so modulated, is coupled to a plurality of correlators which produce d.c. voltages having values indicative of the phase states of the carriers. Binary words, similarly indicative of the phase states, are derived from the d.c. voltages, and these are stored in consecutive form in binary stores. The differences between the binary words yield the transmitted data. The outputs of the aforementioned correlators are connected to inputs of a time multiplexer which acts to connect outputs of two correlators to two multiplexer outputs. The outputs of the time multiplexer are connected to a phase modulator which produces a phase modulated signal responsive to the time multiplexer output signals. The zero crossovers of the phase modulated signal are indicative of the phase states of the carriers. A phase-sensitive analog-digital converter derives from the aforementioned zero crossovers binary words which indicate the phase states of the carriers.

5 Claims, 5 Drawing Figures

3,947,633

CIRCUIT ARRANGEMENT FOR DEMODULATING A FREQUENCY-DIFFERENTIAL, PHASE-MODULATED SIGNAL

BACKGROUND OF THE INVENTION

This invention relates to a circuit arrangement for demodulating a frequency-differential, phase-modulated signal which consists of a plurality of modulated carriers. At the receiving end the signal is conducted to a plurality of correlators whose d.c. voltages assume values indicative of the phase states of the carriers. With the d.c. voltages emitted from the correlators, binary words indicating the phase states are obtained, and these binary words are stored successively in binary stores. The transmitted data are then obtained from the differences between these words.

In frequency-differential phase modulation, the data which are to be transmitted are transmitted with the aid of the phase difference of two carriers which have adjacent frequencies. When the data is restored from the modulated signal, the phase states of the carriers are measured by means of correlators. If the transmitted signal consists of n carriers, in known circuit arrangements, $2n$ correlators, $n$ phase modulators and $n-1$ analogdigital converters are provided for analyzing the phase states of the modulated carriers. If, for example the number $n = 16$, a relatively large expenditure for circuitry is required for the 16 phase modulators and 15 analog-digital converters.

An object of the invention, therefore, is to provide a demodulator for the demodulation of a frequency-differential, phase-modulated signal which overcomes the foregoing disadvantages and which is characterized by a relatively low cost construction.

SUMMARY OF THE INVENTION

In accordance with the invention the foregoing and other objects are achieved in a circuit arrangement of the type described hereinabove wherein the outputs of the correlators are connected to inputs of a time multiplexer which connects successively the outputs of two correlators to two outputs of the time multiplexer. The outputs of the time multiplexer are connected to a phase modulator which, in dependence upon the signals emmitted via the time multiplexer, emits a phase-modulated signal whose zero transitions indicate the phase states of the carriers. The phase-modulated signal is conducted to an analog-digital converter which is operating in phase sensitive manner and which from the analog zero transitions of the phase modulated signal produces the binary words which signal the phase states of the carriers.

The circuit arrangement in accordance with the invention is characterized by a relatively low cost because, assuming a number of $n$ carriers and a number of $2n$ correlators, only one single phase modulator and one single analog-digital converter are required. The time multiplexer discussed hereinabove may be realized in a relatively simple manner with integrated modules.

It is advantageous to employ a phase modulator which comprises two phase stages, an adder, a band pass filter and a zero transition detector. In dependence upon the polarity of the signal emitted by the time multiplexer, one of two phase measuring signals of opposed polarity are allowed through to the adder which forms a sum signal. The sum signal is conducted to the band pass filter which emits a sinusoidal signal of equal period duration to the zero detector which supplies the phase modulated signal.

BRIEF DESCRIPTION OF THE DRAWINGS

The principles of the invention will be more readily understood by reference to a description of a preferred embodiment given below in conjunction with the drawings which are described briefly as follows:

FIG. 2 shows in more detail the demodulator DEM which has been schematically illustrated in FIG. 1, and comprises phase shifting stages P1, P2, P3, and P4, correlators K1, K2, K3, K4, K5, K6, K7 and K8, time multiplex stage ZM, phase modulator PM, analog-digital converter AD, switch SW, stores SP1, SP2, and subtraction stage SB.

In modulation systems using frequency-differential phase modulation, the information is contained in the phase differences of the simultaneously transmitted, modulated carriers. In order to restore the information from the modulated composite signal A, the phase state of each individual carrier is measured by means of the correlators K1 to K8. To simplify the illustration, only four carriers T1 to T4 and the correlators K1 to K8 have been assumed to be provided. The phase shifting elements P1 to P4 each produce a phase rotation of 90°. The d.c. voltages emitted via the outputs of the correlators characterize the phase state of the carriers in analog fashion. The function of the demodulator DEM is to convert the analog d.c. voltages of the correlators in such manner that the output signal G of the modulator successively indicates the phase difference of two adjacent carriers in binary form.

Figure 1:
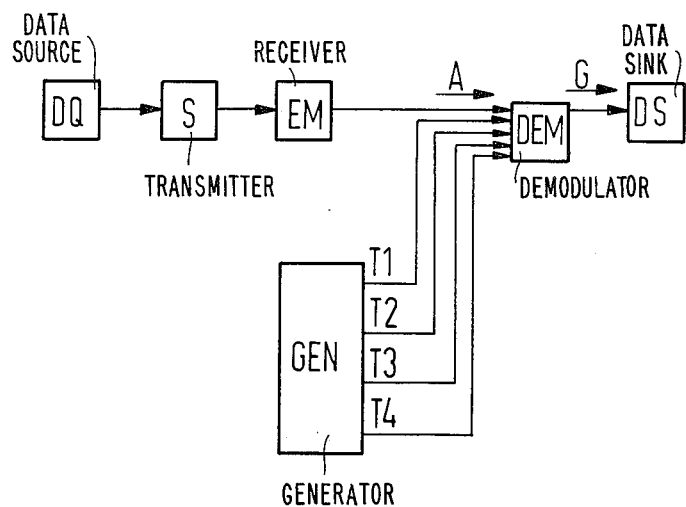
FIG. 1 is a block-schematic diagram showing a system for the transmission of data by means of frequency-differential phase modulation.
Figure 2:
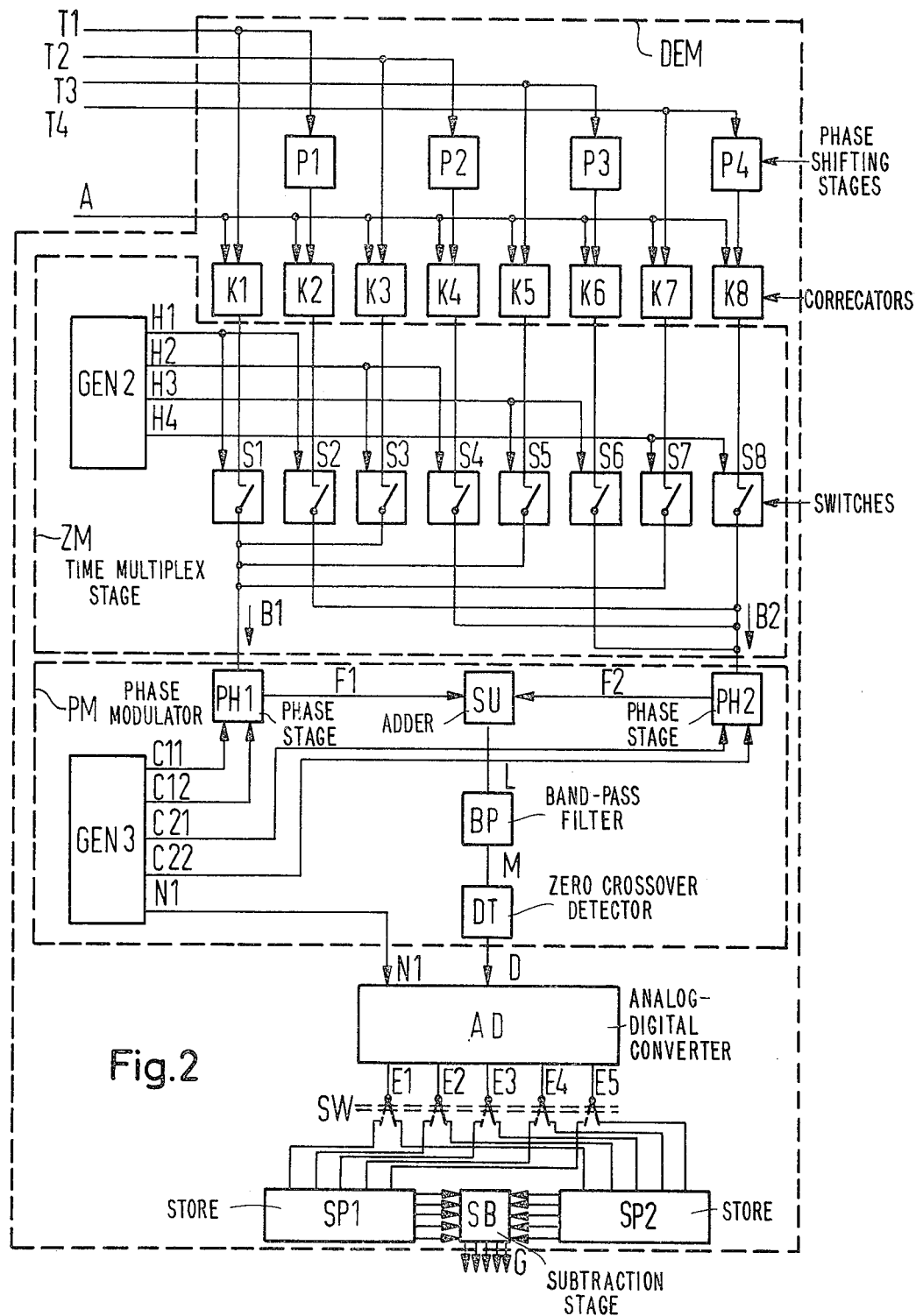
FIG. 2 is a more detailed schematic view of the demodulator for the demodulation of a frequency-differential, phase modulated signal in the FIG. 1 embodiment.

The time multiplexer ZM is composed of the generator GEN2 and of the analog switches S1, S2, S3, S4, S5, S6, S7 and S8 connected in the manner illustrated in FIG. 2.

Figure 3:
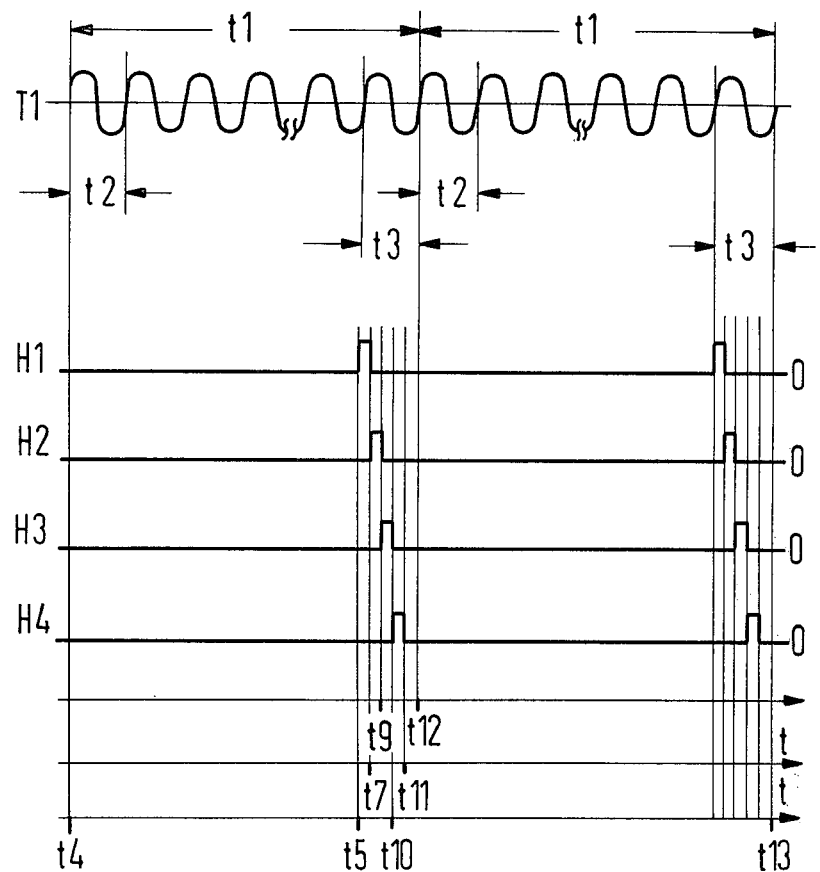
FIG. 3 is a waveform diagram showing signals which characterize the mode of operation of a time multiplexer.

FIG. 3 shows the signals H1, H2, H3 and H4 which are produced with the generator GEN2 illustrated in FIG. 2. The top part of FIG. 3 shows two modulations sections $t1$ of the carrier T1 in a diagrammatic illustration. The first modulation section commences at the time $t4$ and ends at the time $t12$, and the second modulation section starts at the time $t12$ and ends at the time $t13$. Each modulation section is assigned one phase of the modulated carrier. During the interval $t3$ the phases are stored in analog form in the correlators K1 to K8, and are signalled with the aid of the analog d.c. voltages emitted via their outputs. During the intervals $t2$ the analog voltages stored in the correlators are erased. The signals H1 to H4 produced in the generator GEN2 consist of the pulses which occur with a delay within a fraction of the interval $t3$. During the one values of the signals H1 to H4, the switches S1 to S8 illustrated in FIG. 2 become conductive. In this way the outputs of in each case two correlators are successively connected to the inputs of the phase stages PH1 and PH2. For example, with the signal H1=1 the output of the correlator K1 is connected to the input of the phase stage PH1 and the output of the correlator K2 is connected to the input of the phase stage PH2.

The phase modulator PM comprises a generator GEN3, phase stages PH1, PH2, adder stage SU, band pass filter BP, and zero crossover detector DT. Thus, the phase modulator PM is supplied at the input with the signals B1 and B2 whose amplitudes indicate the phase state of the modulated carriers T1 to T4 and, via the output of the phase modulator PM, a signal D is emitted, whose zero crossovers indicate the phase states of the carriers. The signal D is an analog signal and is conducted to the analog digital-converter which, in dependence upon the analog zero crossovers of the signal D emits the binary signals E1, E2, E3, E4, and E5 which represent the phase states in digital form.

The signals E1 to E5 are conducted via the switch SW represented in FIG. 2 successively to the binary stores SP1 and SP2. The individual switches SW assume the broken line position during the times $t7 - t5$, and $t10 - t9$, and assume the solid line position during the times $t9 - t7$, and $t11 - t10$. Thus, with the stores SP1 and SP2 consecutive binary words and phases are stored in digital form. The difference of the binary words is formed with the subtraction circuit SB, via the output of which there is consecutively emitted one of the 32 words G with which the data to be transmitted is represented.

Figure 4:
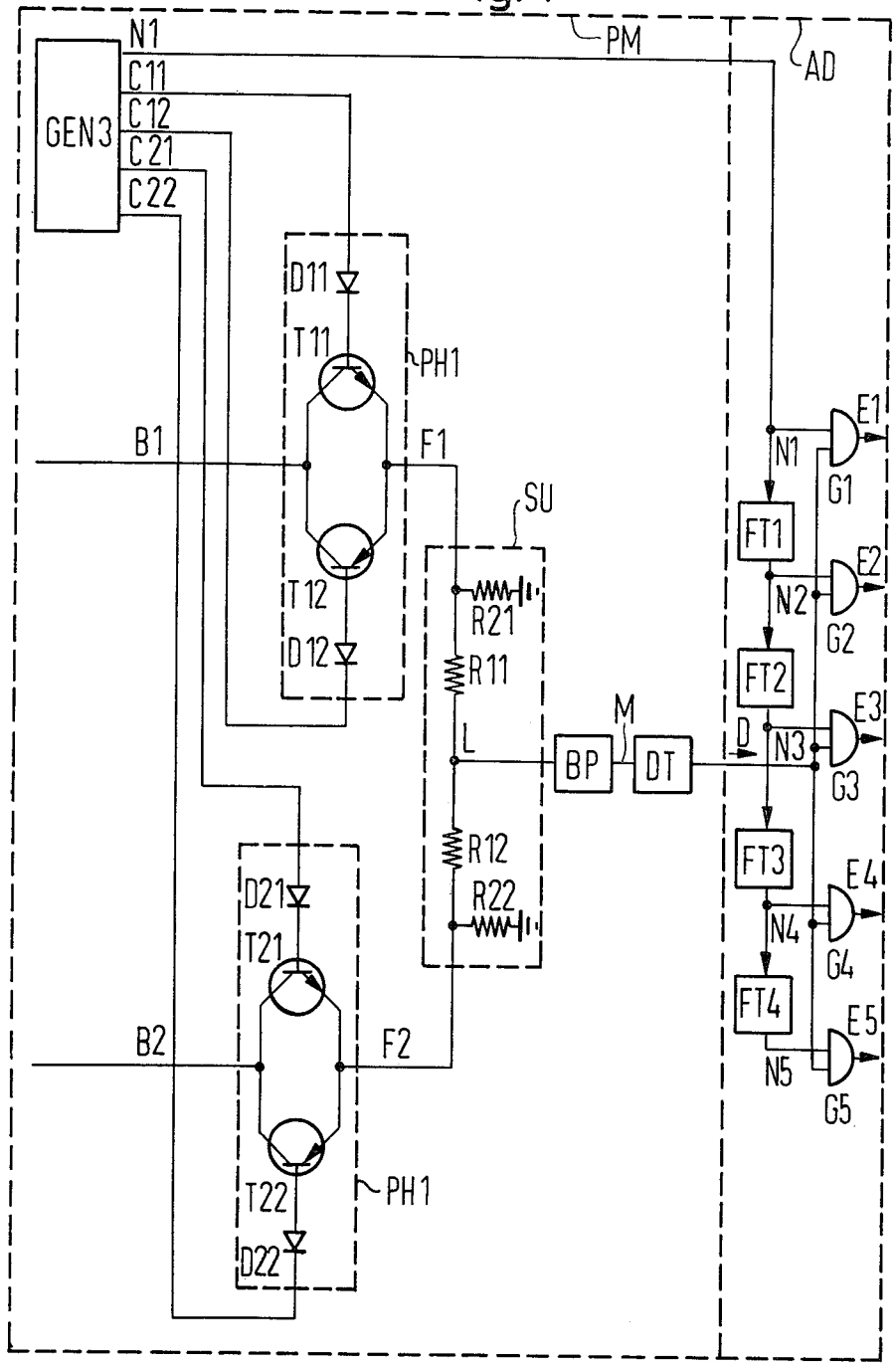
FIG. 4 is a detailed schematic view of a preferred embodiment of the phase modulator in the FIG. 1 embodiment and FIG. 5 is a waveform diagram showing signals with which the mode of operation of a demodulator for the demodulation of frequency-differential, phase-modulated signal mixture will be explained. DETAILED DESCRIPTION OF THE DRAWINGS As shown in FIG. 1, from a data source DQ data are emitted to a transmitter S. In the transmitter sinusoidal carriers are produced, whose phases are altered in intervals of modulation sections. The frequencies of the sinusoidal carriers are multiples of a fundamental frequency. A frequency-differential, phase modulated composite signal composed of these sinusoidal, phase-modulated carriers is transmitted to a receiver EM. The phase-modulated signal can be formed, for example, by the modulation of 16 different carriers. The demodulator DEM is also supplied via the receiver with a phase-modulated composite signal. In the generator GEN1, at the receiving end, the carriers T1, T2, T3 and T4 are produced and conducted to the demodulator DEM. From the demodulator, the demodulated signal G is fed to the data sink DS, for example a teleprinter, a data visual display unit or a data processing system.

FIG. 4 shows in more detail the phase modulator PM which has been schematically illustrated in FIG. 2 and the analog-digital converter AD. The phase stages PH1 and PH2 comprise diodes D11, D12, and D21, D22, transistors T11, T12, and T21, T22. The adder SU comprises resistors R11, R12, R21, R22. The analog-digital converter AD comprises frequency dividers FT1, FT2, FT3 and FT4, which produce a frequency division in the ratio 2 : 1 and AND gates G1, G2, G3, G4 and G5.

Figure 5:
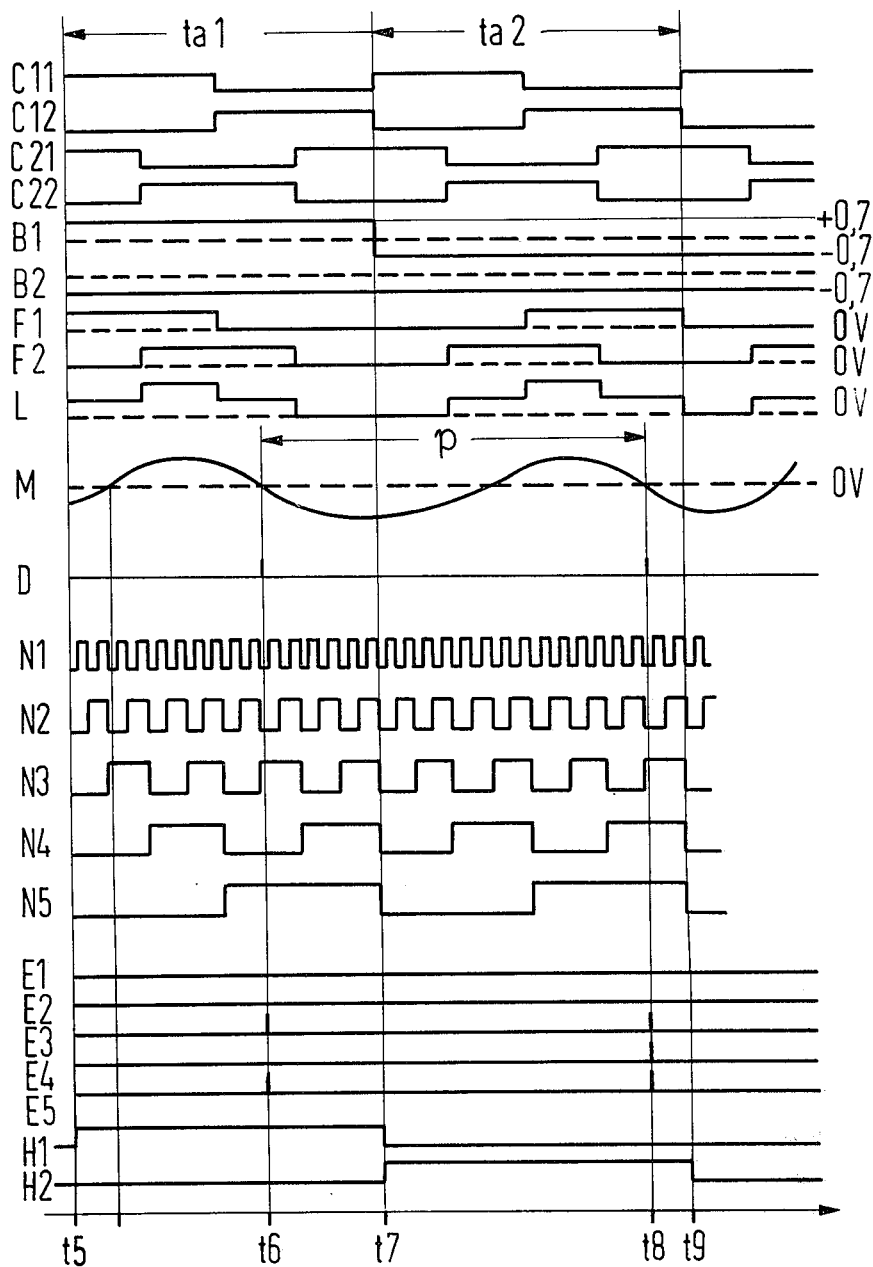

In the following the mode of operation of the modular illustrated in FIGS. 2 and 4 will be explained making reference to the signals shown in FIG. 5. The signals C11, C12, C21 and C22 are produced in the generator GEN3. The signals B1 and B2 characterize, with their amplitudes, the phases states of two carriers. The broken lines of the signals B1, B2, F1, F2, L and M characterize a voltage of 0 V. With respect to the signals B1, the voltages of +0.7 and −0.7 V have been additionally entered. In comparison to FIG. 3 the signals in FIG. 5 have been shown on an enlarged time scale. This can be clearly seen from the signal H1 which is represented in the lower part of FIG. 5 and which assumes a one value from the time $t5$ until the time $t7$. During the interrogation interval $ta1$, from the time $t5$ until the time $t7$ the output signals of the correlators K1 and K2 represented in FIG. 2 are conducted, as parts of the signals B1 and B2, to the phase stages PH1 and PH2. During the following interrogation interval $ta2$, from the time $t7$ until the time $t9$ the signals of the correlators K3 and K4 are fed, as parts of the signals B1 and B2, to the phase stages PH1 and PH2. With the phase stage PH1 the signal F1 is obtained which during the interrogation intervals $ta1$ and $ta2$ represents the product of the amplitudes of the signals C11 and C12 with the signal B1. It is, thus, assumed that the voltage of +0.7 corresponds to the factor one so that during the interrogation intervals $ta1$ and $ta2$ the signal F1 is equal to the signal C1 and the signal C12. Here the phase stage PH1 acts in the manner of a switch which, with the aid of the two complementary transistors T11 and T12, and in dependence upon the polarity of the signal B1 allows through either the signal C11 or the signal C12. The phase stage APH2 is of similar construction and in the illustrated case, when the signal B2 has a negative polarity, the signal C22 is switched through and emitted as the signal F2. Because the signals C11, C21 and C12, C22 have a phase difference of 90°, during an interrogation interval $ta1$, $ta2$, the pulse edges of the signals F1 and F2 are, likewise, displaced in phase by 90°. The two signals F1 and F2 are added in the adder SU producing the signal L.

The function of the band pass filter BP is to suppress harmonics of the signal L. The pass band of the band pass filter BP is selected to be such that a frequency which is equal to the pulse repetition frequency of the signal L is allowed through. In this way the signal M is produced, which has the same period duration p as the signal L. The zero crossover detector DT emits the signal D which characterizes the zero crossover of the signal M.

The analog-digital converter AD is provided at its input with the analog signal D whose zero crossovers characterize the phases of the carriers in analog fashion. The frequency dividers FT1 to FT4 are used to obtain from the signal N1 the signals N2, N3, N4, and N5 which during the interrogation intervals $ta1$, and $ta2$ always represent one of the 32 possible words, each of five bits. Two consecutive words correspond to phases which differ from one another by 360/32 = 11.25°. With the signal D and the gates G1 to G5 one of these words is selected and characterized by the parallel-emitted signals E1 to E5. For example, at the times $t6$ and $t8$ the gates G3, G5, and G3, G4, G5 are opened so that the words E1E2E3E4E5 = 00101 and E1E2E3E4E5 = 00111 are emitted which characterizes two specific phases.

The preferred embodiment described above is intended only to be exemplary of the principles of the invention and is not to be considered as defining the scope of the invention. It is contemplated that the described embodiment can be modified or changed in a variety of ways while remaining within the scope of the invention as defined by the appended claims.

I claim:

1. In a data transmission system using frequency-differential phase modulation wherein a source forms a transmitted signal that is constituted by a plurality of frequency difference phase modulated carriers, and wherein the transmitted data is recovered in the form of binary words indicative of the phase states of said carriers, apparatus for demodulating said frequency differential phase modulated composite signal, comprising:

means for receiving said transmitted signal,
a plurality of correlator means responsive to the signals received to produce d.c. signals which are indicative of the phase states of said carriers,
time multiplexer means for connecting successively outputs of two of said correlator means to two outputs of the time multiplexer,
phase modulation means having inputs coupled to outputs of said time multiplexer means and for producing, in response to said time multiplexer output signals, phase modulated signals having zero crossovers which are indicative of the phase states of said carriers and
phase sensitive analog-digital converter means for producing from said phase modulated signals binary words which are indicative of the phase states of said carriers.

2. The apparatus defined in claim 1 wherein each said carrier is coupled to two of said correlator means and further comprising:

pairs of analog switches, each said pair having inputs connected to outputs of two of said correlator means assigned to a said carrier and having outputs,
first generator means for producing control pulses which occur consecutively within a portion of said storage interval, said control pulses being coupled to said analog switches to cause the connection of the inputs and outputs thereof upon the occurrence of said control pulses.

3. The apparatus defined in claim 1 wherein each said phase modulator means comprises two phase stages for receiving the outputs of said time multiplexer means, adder meanns connected to receive the outputs of said two phase stages, a band pass filter connected to the output of said adder means, a zero crossover detector which receives said band pass filter means output and is connected to the output of said phase modulator means and second generator means for producing phase measuring pulses displaced and phased from each other by 90° and which are coupled to said two phase stages.

4. The apparatus defined in claim 3 wherein each said phase stage comprises a pair of complimentary transistors having collectors connected in common to an output of said time multiplexer means and emitters connected to said adder means and diodes connecting bases of said transistors to said second generator means.

5. The apparatus defined in claim 3 wherein said phase measuring signals have a duration equal to that of said control pulses.

* * * * *